3,414,592
6,7-HALOMETHYLENE ANDROSTANES AND ESTRANES AND PROCESSES FOR THEIR PREPARATION
Colin C. Beard, Boulder, Colo., and Alexander D. Cross, Mexico City, Mexico, assignors to Syntex Corporation, Panama, Panama, a corporation of Panama
No Drawing. Continuation-in-part of application Ser. No. 486,226, Sept. 9, 1965. This application Oct. 22, 1965, Ser. No. 502,375
25 Claims. (Cl. 260—397.4)

ABSTRACT OF THE DISCLOSURE

Novel 6,7-halomethylene androstanes and estranes which are, inter alia, anabolic and progestational agents and processes for the preparation of such compounds.

---

This is a continuation in part of application Ser. No. 486,226, filed Sept. 9, 1965, now U.S. Patent 3,338,928.

This invention pertains to novel steroids, in particular to androstanes and estranes having a halocyclopropyl ring fused to the 6- and 7-positions of the molecule. Specifically the invention is directed at compounds of the formula:

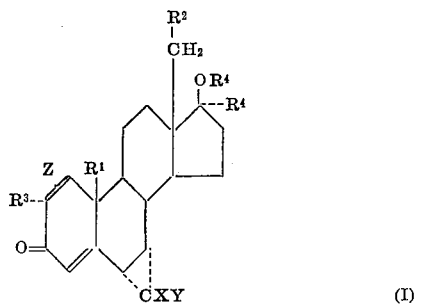

wherein each of $R^1$, $R^2$ and $R^3$, independent of the other is hydrogen or methyl;

$R^4$ is hydrogen, cyclopropyl, or an aliphatic hydrocarbon group, such as alkyl, alkenyl or alkynyl, including haloalkynyl, of 6 or less carbon atoms;

$R^5$ is hydrogen, tetrahydropyranyl, or a hydrocarbon carboxylic acyl group of less than 12 carbon atoms;

Z is a carbon-carbon double bond or carbon-carbon single bond, Z being a single bond when $R^1$ is hydrogen;

X is hydrogen, chloro or fluoro; and

Y is chloro or fluoro.

The hydrocarbon carboxylic acyl group of the present invention will contain less than 12 carbon atoms and may be of a straight, branched, cyclic or cyclic-aliphatic chain structure which is saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, phenoxyacetate, cyclopentylpropionate, aminoacetate, β-chloropropionate, adamantoate, and the like.

The foregoing compounds are anabolic agents with a favorable anabolic androgenic ratio and are accordingly useful in the treatment of dibilatory conditions such as are encountered in post operative periods and in old age. In addition, such compounds have varying degrees of anti-estrogenic, anti-gonadotrophic, anti-fibrillatory and appetite stimulating properties, as well as the ability to lower blood cholesterol levels, suppress the output of the pituitary gland and relieve premenstrual tensions. Those compounds of Formula I wherein $R^4$ is alkynyl, particularly ethynyl or haloethynyl, are progestational agents and useful in fertility control.

The synthesis of these compounds may be accomplished through the treatment of a 3-keto-$\Delta^{4,6}$-estradiene, a 3-keto-$\Delta^{4,6}$-androstadiene or a 3-keto-$\Delta^{1,4,6}$-androstatriene with alkali metal or alkaline earth metal salt of an acid of the formula W—CXY—COOH in which W is chloro, bromo or iodo and X and Y are as above defined. The process is conducted at a temperature above that at which the salt decomposes, as evidenced by the evolution of carbon dioxide, and in the presence of inert, anhydrous polar organic solution such as dimethyl triethylene glycol ether, s-dimethoxyethane, dimethyl diethylene glycol ether and the like. In practice, it is desirable to protect hydroxy groups through the utilization of derivatives which are easily convertible to hydroxy groups such as esters, tetrahydropyranyl ethers or ketones. This preference is not an absolute necessity however, for while free hydroxy groups will often become involved in side reactions under the conditions of the process, they can be readily regenerated by utilization of a mild alkaline hydrolysis after completion of the principal reaction period.

Under the above conditions, a mono or dihalomethylene group adds across the $\Delta^6$ double bond thereby forming a 6,7-monohalo or dihalo cyclopropyl group. The orientation of this addition is predominately α, there being some 6β,7β addition in the case of 3-keto-$\Delta^{4,6}$-estradienes.

The substituents represented by $R^1$ and $R^2$ are generally present in the starting materials which are used in preparing the compounds of the present invention. A methyl group in the 2-position, represented by $R^3$, may similarly be present in the starting material or may be introduced at a subsequent stage. Thus in the latter case, a 3-keto-$\Delta^4$-androstene or 3-keto-$\Delta^4$-estrene bearing a 6α,7α-halomethylene substituent is treated with ethyl formate and sodium hydride, thus introducing a 2-hydroxymethylene substituent. This is then reduced to the 2-methyl group.

Similarly a $\Delta^1$ double bond represented by Z may be present in the starting material, e.g., a $\Delta^{1,4,6}$-androstatriene, or may be generated after introduction of the 6α,7α-halomethylene group, as through the use of 2,3-dichloro-5,6-dicyanobenzoquinone.

The substituents in the 17β position is generally introduced after formation of the 6α,7α-halomethylene function. Thus the 6α,7α group is introduced, according to the procedures described above, in a 17β-acyloxy or 17-keto compound. In the former case, the 17α-acyloxy group may then be hydrolyzed as with potassium hydroxide to the corresponding 17β-hydroxy compound. This may be oxidized to the 17-keto derivative as with chromic trioxide and pyridine.

Treatment of the 17-keto intermediates with a suitable Grignard reagent such as an alkyl magnesium halide, e.g., methyl magnesium halide, or the like then introduces the 17α-aliphatic hydrocarbon substituent. Alternatively various groups such as ethynyl may be introduced through the use of an olefin such as acetylene and potassium metal. A 17α-ethyl group may be obtained through catalytic hydrogenation, as with palladium-on-carbon, of a 17α-ethynyl group. Alternatively selective catalytic hydrogenation with palladium-on-calcium carbonate of a 17α-ethynyl compound yields the corresponding 17α-vinyl derivative.

The 17β-hydroxy compounds of the present invention which are unsubstituted in the 17α-position may be esterified according to conventional procedures such as allowing the alcohol to stand overnight and at room temperaure with the appropriate acyl chloride or acid anhydride. In the case in which the 17α position bears a substituent other than hydrogen, the alcohol is esterified by allowing it to stand with the acid anhydride and corresponding acid, under anhydrous conditions and in the presence of a catalytic amount of a strong acid, such as p-toluenesulfonic acid.

Formation of 17β-tetrahydropyranyl ethers may be realized by treating the free 17β-hydroxy compound with dihydropyran, under anhydrous conditions, in the presence of an acidic catalyst such as p-toluenesulfonic acid, boron trifluoride etherate, etc., and at a temperature of from about 25° C. to about 50° C.

The foregoing transformations may be diagrammatically represented in part as follows:

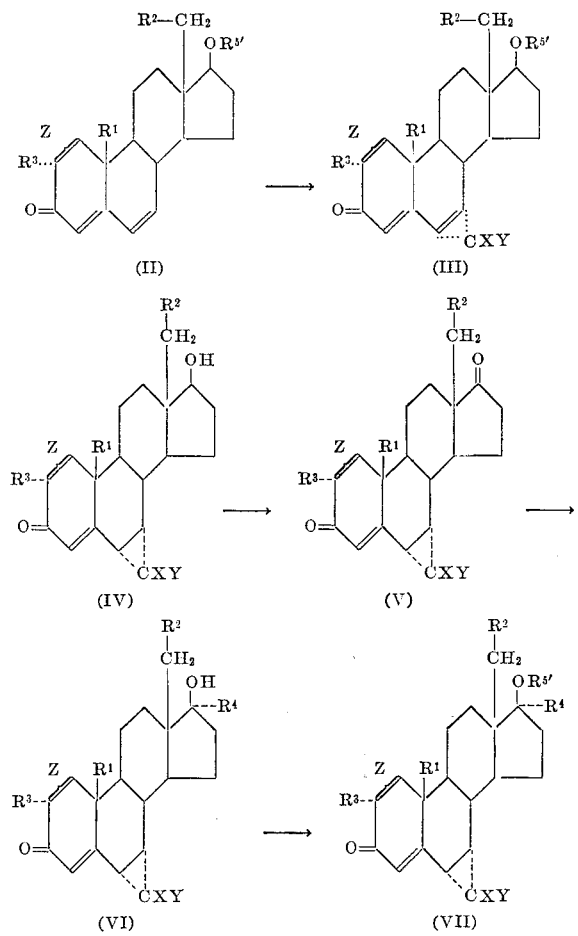

in which $R^1$, $R^2$, $R^3$, $R^4$, Z, and X and Y are as above defined and $R^{5'}$ is tetrahydropyranyl or a hydrocarbon carboxylic acyl group of less than 12 carbon atoms.

The following examples will serve to further typify the nature of this invention but should not be construed as a limitation thereof.

Example 1

To a suspension of 1 g. of 17β-acetoxy-Δ⁴-androsten-3-one in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and then allowed to stand at room temperature for 30 minutes. There is next added 0.8 ml. of pyridine, followed by water until solidification occurs. This solid is collected by filtration, washed with water and air dried to yield 3-ethoxy-17β-acetoxy-Δ³,⁵-androstadiene which is recrystallized from acetone:hexane.

To a solution of 1 g. of 3-ethoxy-17β-acetoxy-Δ³,⁵-androstadiene in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings were colorless and then with water to neutrality, dried over sodium sulfate and evaporated to dryness to yield 17β-acetoxy-Δ⁴,⁶-androstadien-3-one, which may be further purified through recrystallization from acetone: hexane.

To a refluxing solution of 1 g. of 17β-acetoxy-Δ⁴,⁶-androstadien-3-one in 10 ml. of dimethyl diethylene glycol ether is added over a two hour period in a dropwise fashion with stirring, a solution of 35 equivalents of sodium chlorodifluoroacetate in 40 ml. of dimethyl diethylene glycol ether. The mixture is refluxed until the U.V. spectra indicates the disappearance of the 3-keto-Δ⁴,⁶-diene system and is then filtered. The filtrate is evaporated to dryness and the residue is chromatographed on alumina, eluting with methylene chloride, to yield 6α,7α-difluoromethylene-17β-acetoxy-Δ⁴-androsten-3-one.

By subjecting 17β - acetoxy - Δ⁴ - estren - 3 - one and 17β-acetoxy-18-methyl-Δ⁴-estren-3-one to the procedure of this example, there are respectively obtained 6α,7α-difluoromethylene-17β-acetoxy-Δ⁴-estren-3-one and 6α,7α-difluoromethylene-18-methyl-Δ⁴-estren-3-one. Likewise, by the use of 17α-acetoxy-Δ¹,⁴,⁶-androstatrien-3-one, there is obtained 6α,7α - difluoromethylene-17α-acetoxy-Δ¹,⁴-androstadiene-3-one.

Example 2

A solution of 1 g. of 6α,7α-difluoromethylene-17β-acetoxy-Δ⁴-androstan-3-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 6α,7α-difluoromethylene-Δ⁴-androsten-17β-ol-3-one which is recrystallized from methylene chloride:ether.

6α,7α-difluoromethylene-Δ⁴-estren-17α-ol-3-one and 6α,7α-difluoromethylene-18-methyl-Δ⁴-estren-17α-ol - 3 - one are obtained from their 17-acetates in a corresponding fashion.

Example 3

To a stirred, refluxing solution of 1 g. of 17β-acetoxy-Δ⁴,⁶-estradien-3-one in 15 ml. of dimethyl triethylene glycol ether is added in a dropwise fashion a 50% w./v. solution of sodium trichloroacetate in dimethyl triethylene glycol ether. When the further addition of reagent fails to effect a change in the U.V. spectrum, the addition is stopped. The mixture is cooled and filtered. The filtrate is evaporated to dryness and the residue is chromatographed on alumina with methylene chloride to yield 6α,7α - dichloromethylene - 17β - acetoxy - Δ⁴ - estren-3-one. Upon hydrolysis of this compound with potassium hydroxide as described in Example 2, there is obtained 6α,7α - dichloromethylene - Δ⁴ - estren - 17β - ol - 3 - one.

In a similar fashion there is obtained 6α,7α-dichloromethylene-Δ⁴-androsten - 17β - ol - 3 - one and 6α,7α-dichloromethylene-18-methyl-Δ⁴-estren-17β-ol-3-one.

By utilizing sodium dichlorofluoroacetate in the foregoing procedure in place of sodium trichloroacetate, the corresponding 6α,7α-chlorofluoromethylene derivatives are obtained.

Example 4

A solution of 6 g. of 6α,7α-difluoromethylene-Δ⁴-androsten-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed with water, dried and evaporated to yield 6α,7α - difluoromethylene - Δ⁴ - androsten - 3,17 - dione, which may be further purified by recrystallization from acetone:hexane.

Likewise 6α,7α - difluoromethylene - Δ⁴ - estrene - 3,17-dione and 6α,7α-difluoromethylene-18-methyl-Δ⁴-estrene-3,17-dione are obtained via the procedure of this example.

A solution of 5 g. of 6α,7α-difluoromethylene-Δ⁴-androsten-3,17-dione in 250 ml. of thiophene-free benzene is treated with an equimolar amount of methylmagnesium bromide in anhydrous ethyl ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 6α,7α - difluoromethylene-17α-methyl-Δ⁴-androsten-17β-ol-3-one which is recrystallized from methylene chloride:hexane.

6α,7α - difluoromethylene - 17α - methyl - Δ⁴ - estren-17β-ol-3-one and 6α,7α - difluoromethylene - 17α,18 - dimethyl-Δ⁴-estren-17β-ol-3-one are similarly obtained via the foregoing procedure.

Alternatively the foregoing compounds may be prepared in the following manner.

To a stirred suspension of 1 g. of 6α,7α-difluoromethylene-Δ⁴-androsten-17β-ol-3-one in 27 ml. of methanol and 1 ml. of water, under nitrogen is added 0.77 g. of hydroxylamine hydrochloride and 1.1 g. of sodium bicarbonate. The mixture is heated at reflux for three hours and at 45° C. for 20 hours. After concentration of the reaction mixture under reduced pressure to a volume of about 2 ml., there is added 10 ml. of water and 10 ml. of saturated sodium chloride solution. This slurry is stirred for three hours at a temperature below 5° C. The solid which is collected upon filtration is washed with water and dried to yield 6α,7α-difluoromethylene - Δ⁴ - androsten-17β-ol-3-oxime which may be recrystallized from ethyl acetate:heptane.

A solution of 6 g. of 6α,7α - difluoromethylene-Δ⁴-androsten-17β-ol-3-oxime in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 6α,7α - difluoromethylene - Δ⁴ - androsten-17-one-3-oxime which may be further purified by recrystallization from acetone:hexane.

A solution of 5 g. of 6α,7α - difluoromethylene - Δ⁴-androsten-17-one-3-oxime in 250 ml. of thiophene-free benzene is treated with 27.5 ml. of 4 N methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 6α,7α-difluoromethylene - 17α - methyl-Δ⁴-androsten-17β-ol-3-oxime which is recrystallized from methylene chloride:hexane.

To a solution of 1 g. of 6α,7α-difluoromethylene-17α-methyl-Δ⁴-androsten-17β-ol-3-oxime in 15 ml. of dimethylformamide are added 5 ml. of 10% sulfuric acid. The mixture is heated at steam bath temperatures for one hour, cooled and diluted with water. The solid which forms is collected by filtration, washed with water to neutrality, dried and chromatographed on Florisil absorbent to yield 6α,7α - difluoromethylene - 17α - methyl - Δ⁴ - androsten-17β-ol-3-one which may be further purified through recrystallization from acetone:hexane.

Example 5

A solution of 1 g. of 6α,7α - difluoromethylene-Δ⁴-estrene - 3,17 - dione in 30 ml. of anhydrous benzene is added under nitrogen to a solution of 1.4 g. of potassium in 30 ml. of t-amyl alcohol. A slow current of purified acetylene is then passed through the solution for 40 hours. The mixture is then diluted with water and extracted with benzene. These extracts are washed with water to neutrality, dried over sodium sulfate and evaporated. Chromatography of the residue on alkaline alumina with 2:3 hexane:benzene yields 6α,7α - difluoromethylene - 17α-ethynyl - Δ⁴ - estren-17β-ol-3-one which is recrystallized from acetone:hexane.

6α,7α - difluoromethylene - 17α - ethynyl-Δ⁴-androsten-17β-ol-3-one and 6α,7α-difluoromethylene - 17α - ethynyl-18 - methyl - Δ⁴ - estren - 17β - ol - 3 - one are similarly obtained via the foregoing procedure.

Example 6

A solution of 1 g. of 6α,7α - difluoromethylene-17α-ethynyl-Δ⁴-estren-17β-ol-3-one in 40 ml. of pyridine is hydrogenated at 25° C. atmospheric pressure in the presence of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 6α,7α-difluoromethylene - 17α - vinyl - Δ⁴ - estren - 17β - ol - 3-one which is further purified through recrystallization from acetone.

In a similar fashion, 6α,7α - difluoromethylene-17α-vinyl - 18 - methyl - Δ⁴ - estren - 17β - ol - 3 - one and 6α,7α - difluoromethylene - 17α - vinyl - Δ⁴ - androsten-17β-ol-3-one are obtained.

Example 7

A solution of 3 g. of 6α,7α - difluoromethylene-17α-ethynyl - Δ⁴ - estren-17β-ol-3-one in 125 ml. of dioxane is hydrogenated at 25° C./570 mm. with 0.5 g. of prehydrogenated 10% palladium-on-charcoal. Upon the consumption of the theoretical amount of hydrogen, the solution is filtered and the filtrate evaporated to dryness under reduced pressure to yield 6α,7α - difluoromethylene-17α-ethyl-Δ⁴-estren-17β-ol-3-one which is recrystallized from acetone.

In a like fashion, 6α,7α - difluoromethylene-17α-ethyl-18 - methyl - Δ⁴ - estren - 17β - ol - 3 - one and 6α,7α-difluoromethylene - 17α - ethyl-Δ⁴-androsten-17β-ol-3-one are obtained via the foregoing procedure.

Example 8

A solution of 8.5 g. of 1,2 - dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0.5 g. of 6α,7α - difluoromethylene - Δ⁴ - androstene - 3,17 - dione in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with 8:2 hexane:ether to yield 6α,7α - difluoromethylene - 17α - chloroethynyl - Δ⁴ - androsten - 17β - ol - 3 - one which may be recrystallized from methanol.

In a similar fashion, 6α,7α - difluoromethylene - 17α-chloroethynyl - Δ⁴ - estren - 17β - ol - 3 - one and 6α,7α-difluoromethylene - 17α - chloroethynyl - 18 - methyl-Δ⁴-estren-17β-ol-3-one are prepared via the procedure of this example.

Example 9

A mixture of 7 g. of methylene iodide and 3 g. of zinc-copper couple in 15 ml. of anhydrous ether is heated at reflux under nitrogen for 3 hours. The mixture is then cooled and 2 g. of 6α,7α - difluoromethylene - 17α - vinyl-Δ⁴ - estren - 17β - ol - 3 - one are added. This mixture is allowed to stand at room temperature for 2 hours and is then poured into 200 ml. of 2% aqueous sodium carbonate and extracted twice with 100 ml. portions of ether. These extracts are dried over sodium sulfate and evaporated under reduced pressure. The residue is held at 0.01 mm. to remove any unreacted methylene iodide and then recrystallized from hexane to yield 6α,7α - difluoromethylene-17α-cyclopropyl-Δ⁴-estren-17β-ol-3-one.

In a similar fashion, 6α,7α - difluoromethylene - 17α-cyclopropyl - 18 - methyl - Δ⁴ - estren - 17β - ol - 3 - one and 6α,7α - difluoromethylene - 17α - cyclopropyl-Δ⁴-androsten-17β-ol-3-one are obtained via the above procedure.

Example 10

Two milliliters of dihydropyran are added to a solution of 1 g. of 6α,7α - difluoromethylene - 17α - ethynyl-Δ⁴-estren-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 6α,7α - difluoromethylene - 17α-ethynyl - 17β - tetrahydropyranyloxy - Δ⁴ - estren-3-one which is recrystallized from pentane.

In a similar fashion, the other 17β-hydroxy compounds of the present invention are converted to the corresponding tetrahydropyranyl ethers via the procedure of this example.

Example 11

A mixture of 1 g. of 6α,7α-difluoromethylene-17α-chloro-ethynyl-18-methyl-Δ⁴-estren-17β-ol-2-one, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 6α,7α - difluoromethylene - 17α-chloro-ethynyl-17β-acetoxy-18-methyl-Δ⁴-estren-3-one which is recrystallized from acetone:ether.

By utilizing other anhydrides such as propionic anhydride in the foregoing procedure, the corresponding 17β-acylates are obtained. Similarly other 17β-hydroxy compounds of the present invention may be substituted in the above procedure to yield the corresponding 17β-esters.

Example 12

A mixture of 2 g. of 6α,7α-difluoromethylene-Δ⁴-estren-17β-ol-3-one in 8 ml. of pyridine and 4 ml. of adamantoyl chloride is heated at steam bath temperatures for one hour. The mixture is then poured into ice water and the solid which forms is collected by filtration, washed with water and dried to yield 6α,7α-difluoromethylene-Δ⁴-estren-17β-ol-3-one adamantoate which is further purified through recrystallization from methylene chloride: hexane.

In a similar fashion 6α,7α-difluoromethylene-Δ⁴-androsten-17β-ol-3-one adamantoate and 6α,7α-difluoromethylene - 18-methyl-Δ⁴-estren-17β-ol-3-one adamantoate are prepared according to the foregoing procedure. Use of other hydrocarbon carboxylic acid chlorides in the above procedure alternatively forms the corresponding 17β-acyloxy derivatives.

What is claimed is:
1. Compounds of the formula:

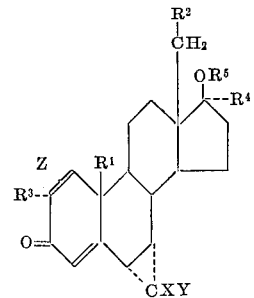

wherein
each of $R^1$, $R^2$ and $R^3$ is hydrogen or methyl;
$R^4$ is hydrogen, cyclopropyl, alkyl, alkenyl, alkynyl or haloalkynyl of 6 or less carbon atoms;
$R^5$ is hydrogen, tetrahydropyranyl or a hydrocarbon carboxylic acyl group of less than 12 carbon atoms;
Z is a carbon-carbon double bond or a carbon-carbon single bond, Z is being a single bond when $R^1$ is hydrogen; and
X is hydrogen, chloro or fluoro; and
Y is chloro or fluoro.

2. Compounds of the formula:

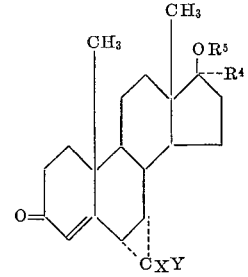

wherein
$R^4$ is hydrogen, cyclopropyl, or alkyl, alkenyl, alkynyl, or haloalkynyl of 6 or less carbon atoms;
$R^5$ is hydrogen, tetrahydropyranyl or a hydrocarbon carboxylic acyl group of less than 12 carbon atoms; and each of X and Y is chloro or fluoro.

3. Compounds of the formula:

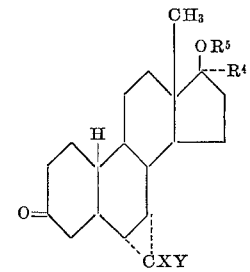

wherein
$R^4$ is hydrogen, cyclopropyl, or alkyl, alkenyl, alkynyl or haloalkynyl of 6 or less carbon atoms;
$R^5$ is hydrogen, tetrahydropyranyl, or a hydrocarbon carboxylic acyl group of less than 12 carbon atoms; and each of X and Y is chloro or fluoro.

4. 6α,7α-difluoromethylene-17α-ethynyl-Δ⁴-estren-17β-ol-3-one.

5. 6α,7α-difluoromethylene-17α-vinyl-Δ⁴-estren-17β-ol-3-one.

6. 6α,7α-difluoromethylene-17α-ethyl-Δ⁴-estren-17β-ol-3-one.

7. 6α,7α-difluoromethylene-Δ⁴-androsten-17β-ol-3-one.

8. 6α,7α-difluoromethylene-17α-methyl-Δ⁴-estren-17β-ol-3-one.
9. 6α,7α-difluoromethylene-17α-vinyl-18-methyl-Δ⁴-estren-17β-ol-3-one.
10. 6α,7α-difluoromethylene-17α-ethyl-18-methyl-Δ⁴-estren-17β-ol-3-one.
11. 6α,7α-difluoromethylene-17α-ethynyl-18-methyl-Δ⁴-estren-17β-ol-3-one.
12. 6α,7α-difluoromethylene-17α-chloroethynyl-18-methyl-Δ⁴-estren-17β-ol-3-one.
13. 6α,7α-difluoromethylene-17α-methyl-Δ⁴-androsten-17β-ol-3-one.
14. 6α,7α-difluoromethylene-17α,18-dimethyl-Δ⁴-estren-17β-ol-3-one.
15. 6α,7α-difluoromethylene-17α-chloroethynyl-Δ⁴-androsten-17β-ol-3-one.
16. 6α,7α-difluoromethylene-17α-cyclopropyl-Δ⁴-estren-17β-ol-3-one.
17. 6α,7α-difluoromethylene-Δ⁴-estren-17α-ol-3-one.
18. 6α,7α-difluoromethylene-17α-cyclopropyl-18-methyl-Δ⁴-estren-17β-ol-3-one.
19. 6α,7α-difluoromethylene-17α-chloroethynyl-Δ⁴-estren-17β-ol-3-one.
20. 6α,7α-difluoromethylene-Δ⁴-estren-17β-ol-3-one adamantoate.
21. 6α,7α-difluoromethylene-18-methyl-Δ⁴-estren-17β-ol-3-one.
22. 6α,7α-difluoromethylene-17α-ethyl-Δ⁴-androsten-17β-ol-3-one.
23. 6α,7α-difluoromethylene-17α-vinyl-Δ⁴-androsten-17β-ol-3-one.
24. 6α,7α-difluoromethylene-17α-ethynyl-Δ⁴-androsten-17β-ol-3-one.
25. 6α,7α-difluoromethylene-17α-cyclopropyl-Δ⁴-androsten-17β-ol-3-one.

References Cited
UNITED STATES PATENTS 3,047,566  7/1962  Godtfredsen et al.  _ 260—239.55

HENRY A. FRENCH, *Primary Examiner.*

UNITED STATES PATENT OFFICE
CERTIFICATE OF CORRECTION

Patent No. 3,414,592                          December 3, 1968

Colin C. Beard et al.

It is certified that error appears in the above identified patent and that said Letters Patent are hereby corrected as shown below:

Column 1, lines 26 to 40, that portion of the formula readin "$OR^4$" should read -- $OR^5$ --. Column 3, lines 25 to 35, formula (III) should appear as shown below:

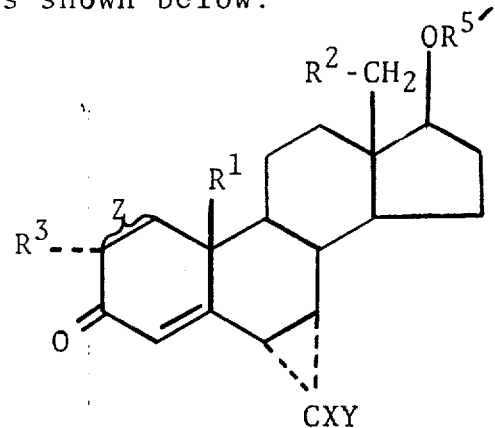

Column 8, lines 51 to 62, the formula should appear as shown beloy

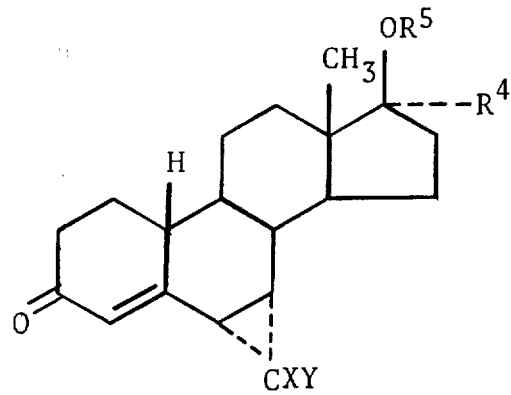

Signed and sealed this 17th day of March 1970.

(SEAL)
Attest:

EDWARD M. FLETCHER, JR.                   WILLIAM E. SCHUYLER, JR.
Attesting Officer                              Commissioner of Patents